Figure 1:
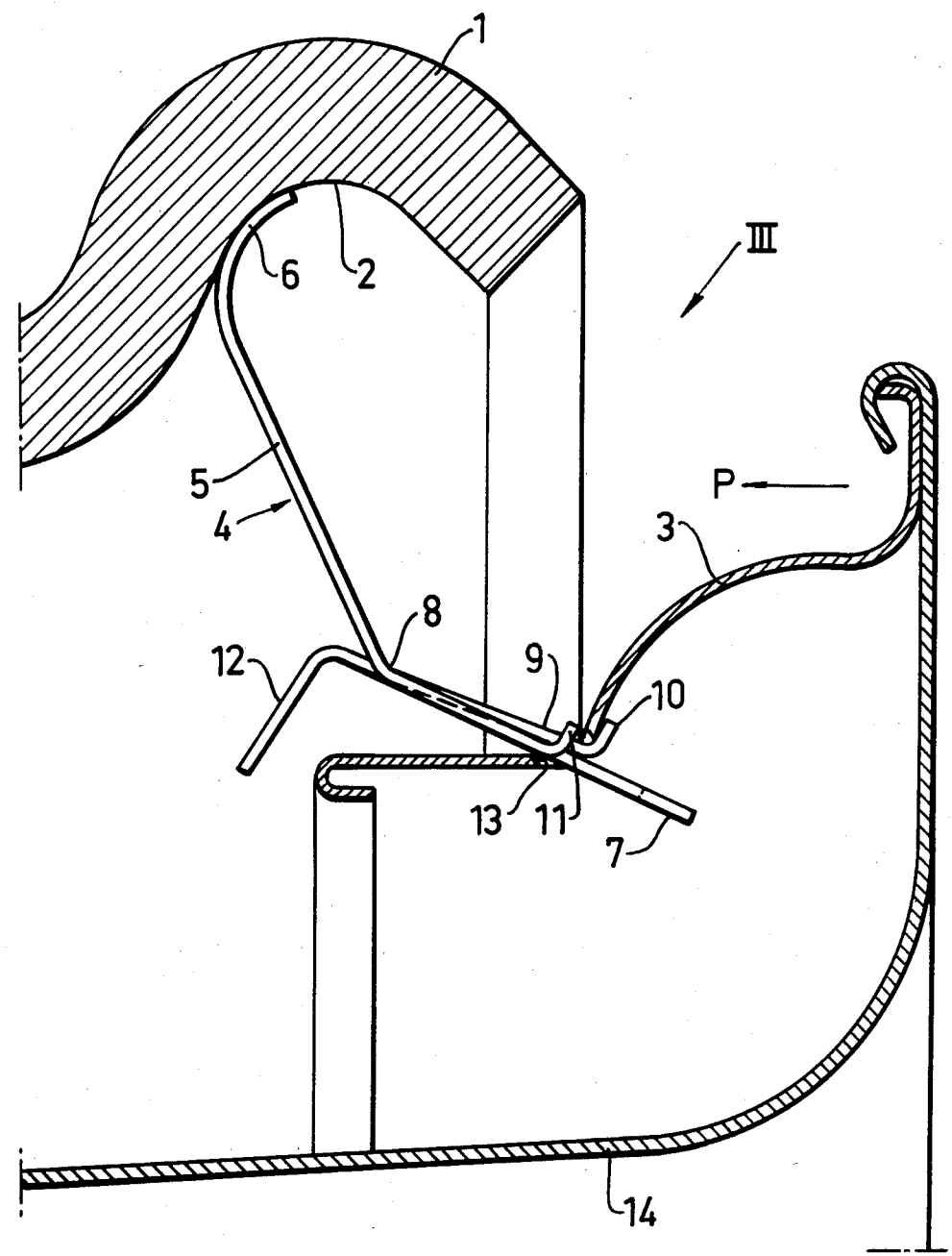

United States Patent [19]

Arvidsson

[11] Patent Number: 4,598,952
[45] Date of Patent: Jul. 8, 1986

[54] DEVICE FOR MOUNTING OBJECTS INTENDED FOR ATTACHMENT TO RIMS OF VEHICLE WHEELS

[75] Inventor: Krister Arvidsson, Eskilstuna, Sweden

[73] Assignee: AG Segerstrom och Svensson, Eskilstuna, Sweden

[21] Appl. No.: 709,377

[22] Filed: Mar. 7, 1985

[30] Foreign Application Priority Data

Mar. 12, 1984 [SE] Sweden ............................. 8401362

[51] Int. Cl.⁴ ............................................. B60B 23/06
[52] U.S. Cl. ..................................................... 301/37 C
[58] Field of Search ............. 301/37 C, 37 R, 37 CD, 301/37 P, 37 TP, 37 T, 37 B

[56] References Cited

U.S. PATENT DOCUMENTS 2,386,229 10/1945 Lyon .................................. 301/37 R
2,394,958 2/1946 Wood ................................ 301/37 R
2,455,151 11/1948 Wood ............................. 301/37 CD
3,348,885 10/1967 Dully et al. .................... 301/37 CD
3,575,468 4/1971 Kapanka ............................ 301/37 R Primary Examiner—Robert B. Reeves
Assistant Examiner—Carol L. Olson
Attorney, Agent, or Firm—Cushman, Darby & Cushman

[57] ABSTRACT

For mounting of objects intended to be attached to rims of vehicles, which rims have a peripheral recess radially open inwards, a device is used which includes a ring (3) and a number of clamps (4) pivotably arranged around a hinge (11, 13) and evenly spaced at the ring. Each of the clamps has a free end (5) radially outside the ring and a support portion (12) arranged between the ring (3) and the free end (5) directed axially seen inwards towards the wheel hub. When the free end (5) is arranged in the recess (2) and after the ring is pressed axially inwards towards the wheel hub, the support portion (12) will form a stop for the pivotal motion of the clamps (4) after the hinge (11, 13) being axially inside the recess (2).

6 Claims, 3 Drawing Figures

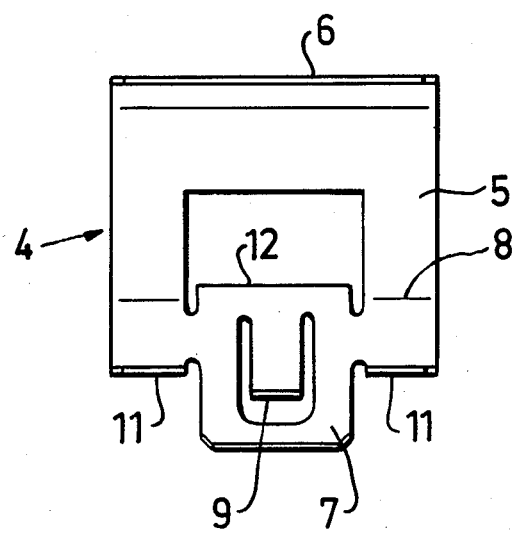

DEVICE FOR MOUNTING OBJECTS INTENDED FOR ATTACHMENT TO RIMS OF VEHICLE WHEELS

This invention relates to a device for mounting objects intended for attachment to rims of vehicle wheels. Such objects are for instance hub caps, wheel discs or wheel rings.

These objects which normally have a decorative purpose but also, in case of wheel discs covering the relatively deep wheel hubs of lorry wheels, may have a practical function in that the wheel disc prevents stones from entering the wheel hubs and causing damage when being thrown out during the motion of the vehicle, are usually snapped in to be centered at the wheel by means of clips or holders, which are attached to the object to be mounted and engage undercuts in the rim. However, this method does not provide any acceptable attachment of the object or centering thereof at the wheel. By the inexact attachment the object will also wobble at the rotation of the wheel. It may also be difficult to use clips or holders at the rims of lorry wheels because the undercut of the rim edge is too deep. Therefore some type of clamps is used to attach wheel discs or similar objects to a lorry wheel, which clamps are screwed onto the rim by means of the wheel nuts. Said objects are in their turn screwed onto the transverse web of the clamp. Usually a noncentered and skew attachment is obtained besides the fact that the mounting of the object is relatively time-consuming. A large assortment of clamps is required at the point of sale.

By means of the present invention set forth in the characterizing portions of the claims it is possible to mount wheel discs, hub caps or wheel rings, so that they are centered and not warped, both at wheels of lorries and private cars. By the exact mounting it is also possible, instead of said types of objects to mount e.g. sensors for non-locking brakes at the wheel rim.

Figure 2:
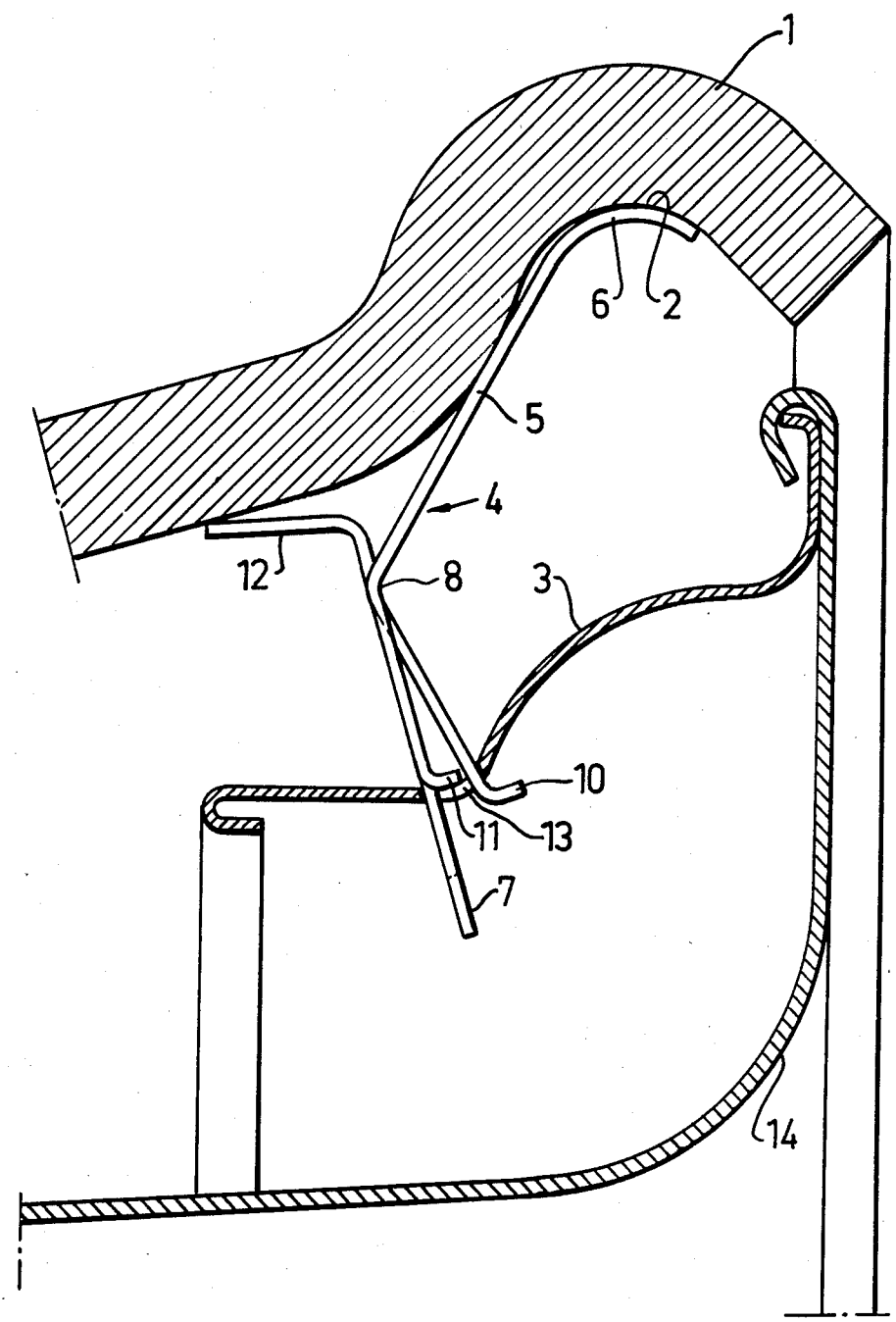

The invention will be described more in detail in the form of an example with reference to the drawing, in which FIG. 1 shows the device of the invention when the device is being applied to a wheel rim, and FIG. 2 shows the device as finally mounted in its position.

FIG. 3 shows a member, more exactly the holder included in the device of the invention.

1 designates the rim edge of a lorry wheel which, thus, forms a peripheral recess 2 radially open inwards at the outer edge of the rim.

The device of the invention consists of a ring 3 and a number of clamp means 4 evenly spaced along the periphery thereof. The number of clamp means may vary depending on diameter, desired clamping force and so on. The clamp means 4 which is shown from the side in FIGS. 1 and 2 and in a top plan view in FIG. 3, is pivotably mounted in the ring 3.

The clamp means 4 includes, as seen in FIG. 3, a plate 5, which along its free edge has a curved portion 6, whose radius of curvature substantially agrees with the radius of the recess 2, and a narrower tongue 7 arranged at the edge opposite to the curved portion 6. The plate 5 has a bend 8. A finger 9 is punched from the part of the plate 5 adjacent the tongue, which finger is provided with a bent-out portion 10 at its free end substantially perpendicular to the plane of the finger. The free edges of the plate 5 have also on both sides of the tongue 7 each a bent-out portion 11, the direction of which is the same as the bent-out portion 10. Moreover, a support portion 12 is punched from the plate 4, which is bent in the same direction as the point of the plate 4 formed by the bend 8, i.e. towards the interior of the wheel hub, at the mounting of the ring 3 by the clamp means 4.

The clamp means 4 is pivotably mounted in the ring 3 in such a way that the tongue 7 is inserted into slots 13, the relative length of which corresponds to the width of the tongue 7. When the clamp means 4 is being mounted, the tongue 7 is thus brought down into the slot 13 and the finger 9 with the bent-out portion 10 is snapped in behind the inside of the ring 3. The clamp means 4 will then rest with the bent-out portions 11 against the outside of the ring, while the clamp means is prevented from falling out of the ring 3 by means of the bent-out portion 10.

Thus, FIG. 1 shows the adaptation of the ring by means of the clamp means 4 with their curved portions 6 engaging the recess 2 of the wheel hub. By applying a force in the direction P of the arrow the clamp means 4 will turn hinge-like about the edge of the slot 13 at the same time as the clamp means is resiliently compressed. When the ring 3 has entered its intended, mounted position, see FIG. 2, the plate 5 has passed the recess 2 and, in principle, a snapping over function of the clamp means 4 is obtained which, thus, tends to press the ring 3 further into the hub. However, by the arrangement of the support portion 12 the motion of the clamp means 4 is limited as the support portion 12 will bear against the wheel hub when the clamp means 4 and consequently the ring 3 have entered the intended position.

Now the ring 3 can only be loosened by applying a force in a direction opposite to the arrow P overcoming the spring force of the clamp means 4. It is clearly realized from the above description that a possibility of a perfectly satisfactory fixation of the device both in respect of centering and axial position in the hub is obtained by the arrangement of the ring 3 and the clamp means 4 pivotably mounted at this.

Thus, it is possible at the arrangement of the invention, the ring 3 and the clamp means 4, to attach the desired object, such as a wheel ring 14 or some other object, e.g. wheel fairing, hub cap and so on. As is shown in FIGS. 1 and 2 these objects can be attached by bending together with the ring 3, but of course they can also be attached to the ring 3 in another suitable manner (screwing, riveting, glueing etc.) Of course the ring 3 can also be made integral with the object to be mounted to the wheel hub. Thus, the wheel ring 14 can for example be directly formed with a ring 3. It is, moreover, to be understood that the clamp means 4 instead of being provided with a distinct bend 8 can also be bent in a bow.

What I claim is:

1. A device for mounting of objects to be carried by vehicle wheel rims, which rims have a peripheral recess open radially inwards, said device comprising a ring and a plurality of clamp means spaced around the ring, each clamp means having an inner end portion pivotally mounted on the ring at a hinge location so that the clamp means can swing toward and away from the wheel rim and a free end outside the ring, a support portion of each clamp means extending axially inwards towards the wheel and arranged between the ring and the free end, said support portion forming a stop for the pivotal motion of the clamp means upon engagement of the free end in the recess and after the ring has been pressed axially inwards towards the wheel.

2. Device as claimed in claim 1, wherein each clamp means has the form of a bent plate having a curved edge portion with a radius substantially agreeing with the radius of the recess and forming the free end of the clamp means and wherein the concave side of the plate will be turned outwards from the hub when the device is being mounted.

3. The device of claim 2, wherein the edge opposite to the curved portion of the clamp means forms a support against the ring and has a tongue which is arranged to extend through a slot in the ring thereby forming the hinge location.

4. The device of claim 3, wherein a finger is arranged on the plate, which finger extends through the slot and is provided with a bent-out portion at its free end.

5. The device of claim 3, wherein the plate has the form of two substantially plane portions forming an angle to each other, the edge of one of said portions forming the free end of the clamp means and the edge of the other portion having the tongue.

6. Device as claimed in claim 1, wherein the objects are combined with the ring and are supported by said ring.

* * * * *